(12) United States Patent
Hartley

(10) Patent No.: US 10,862,893 B2
(45) Date of Patent: Dec. 8, 2020

(54) METHOD FOR NETWORK POLICY MANAGEMENT OF FOREGROUND APPLICATIONS

(71) Applicant: GM Global Technology Operations LLC, Detroit, MI (US)

(72) Inventor: Steven Hartley, Pointe-Claire (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 216 days.

(21) Appl. No.: 16/135,675

(22) Filed: Sep. 19, 2018

(65) Prior Publication Data

US 2020/0092295 A1 Mar. 19, 2020

(51) Int. Cl.
*H04L 29/06* (2006.01)
*H04W 48/14* (2009.01)
*H04L 12/24* (2006.01)
*H04W 48/16* (2009.01)

(52) U.S. Cl.
CPC ............ *H04L 63/102* (2013.01); *H04L 41/12* (2013.01); *H04L 63/0254* (2013.01); *H04W 48/14* (2013.01); *H04W 48/16* (2013.01)

(58) Field of Classification Search
CPC ... H04L 63/102; H04L 41/12; H04L 63/0254; H04L 63/101; H04L 63/0263; H04W 48/14; H04W 48/16; H04W 12/00506
See application file for complete search history.

(56) References Cited

U.S. PATENT DOCUMENTS

| | | | | |
|---|---|---|---|---|
| 9,635,486 | B2* | 4/2017 | Ford | H04L 67/36 |
| 9,973,930 | B2* | 5/2018 | Raleigh | H04W 12/0806 |
| 2013/0024921 | A1 | 1/2013 | Gupta et al. | |
| 2014/0315536 | A1* | 10/2014 | Chow | H04W 8/18 |
| | | | | 455/419 |
| 2015/0223059 | A1 | 8/2015 | Canpolat et al. | |
| 2017/0055302 | A1 | 2/2017 | Wang et al. | |
| 2017/0078956 | A1* | 3/2017 | LeBlanc | H04W 48/18 |

OTHER PUBLICATIONS

Wi-Fi Alliance, "Hotspot 2.0 (Release 2) Technical Specification", Version 1.2, 2016.
Wi-Fi Alliance, "Wi-Fi Certified Passpoint (Release 2) Deployment Guidelines", Version 1.2, 2016.
Hartley, Steven; Unpublished U.S. Appl. No. 16/013,279, Jun. 20, 2018.

* cited by examiner

*Primary Examiner* — Christopher C Harris

(57) ABSTRACT

A system and method for managing a network policy of an application on a client includes discovering, by the client, a first network, determining if the first network is a restricted network, applying a restricted network rule to the client when the first network is a restricted network, lowering a network score of the first network when the first network is a restricted network, and associating with the first network.

20 Claims, 2 Drawing Sheets

METHOD FOR NETWORK POLICY MANAGEMENT OF FOREGROUND APPLICATIONS

INTRODUCTION

The present disclosure relates generally to a system and method for managing a network policy of foreground applications between a client and a service provider in a wireless communication system.

Wireless communication systems, including the infrastructure for wireless local area networks (WLAN) and wireless fidelity (Wi-Fi) access points, generally operate under the protocols of the Institute of Electrical and Electronics Engineers (IEEE) 802.11 series of standards. Recent efforts have been devoted to developing a series of standards to simplify the connection of a client, such as a mobile device, with a public Wi-Fi hotspot or cellular network while roaming. For example, the Wi-Fi Alliance® supports a certification program and technical specifications for Wi-Fi Certified Passpoint™, also known as Wi-Fi Hotspot 2.0, which enables a secure and automatic connection between a client and a service provider, such as a public Wi-Fi hotspot or cellular network, even while roaming. Other examples include the IEEE 802.11u technical specifications which provides Access Network Query Protocol (ANQP) and the Wireless Broadband Alliance Next Generation Hotspot initiative.

As clients connect to various Wi-Fi networks via hotspot access points, these Wi-Fi networks may be restricted. Restricted Wi-Fi networks have network policies that may restrict the ability of certain foreground applications, i.e. applications that have activity or services running on the client in the foreground such that a user is aware of the applications, to access the restricted network. Currently, network policies are enforced only to background applications on a per application basis using the application unique identifier (UID). Where an application is restricted from accessing the network, the application is prevented from accessing any network. Accordingly, there is a need in the art for a network policy management system and method that allows permitted applications access to restricted networks while allowing prohibited applications access to other unrestricted networks.

SUMMARY

According to several aspects, a method for managing a network policy of an application on a client includes discovering, by the client, a first network, determining if the first network is a restricted network, applying a restricted network rule to the client when the first network is a restricted network, lowering a network score of the first network when the first network is a restricted network, and connecting to the first network.

In another aspect, lowering the network score of the first network includes reducing a numerical value of the network score.

In another aspect, the method includes connecting to a second network.

In another aspect, the method includes setting a second network score to the second network, and wherein lowering the network score of the first network includes lowering the network score lower than the second network score.

In another aspect, a network with the highest network score is set as a default network.

In another aspect, determining if the first network is a restricted network includes determining if the client has a per provider subscription management object (PPS-MO) for the first network.

In another aspect, determining if the first network is a restricted network includes determining if the PPS-MO includes an Application Policy.

In another aspect, the Application Policy sets an access permission to the first network of the application on the client.

In another aspect, the PPS-MO further includes nodes for credentials and associated data that have been provisioned by a service provider of the first network.

In another aspect, the PPS-MO is associated with a set of protocols which allow the client to connect with the first network by saving client credentials and resubmitting the client credentials each time the client connects to the first network.

In another aspect, the Application Policy includes an access type which indicates what kind of access permission the application policy sets.

In another aspect, the access type includes a type wherein the application has unrestricted access to the first network.

In another aspect, the access type includes a whitelist type wherein the application has unrestricted access to the first network if the application is on an application policy list and is blocked from access to the first network if the application is not on the application policy list.

In another aspect, the access type includes a blacklist type wherein the application has unrestricted access to the first network if the application is not on an application policy list and is blocked from access to the first network if the application is on the application policy list.

In another aspect, the access type includes a vendor type wherein only an application associated with a particular vendor is allowed access to the first network.

In another aspect, discovering, by the client, the first network includes using pre-association discovery under IEEE 802.11u and Access Network Query Protocol (ANQP).

In another aspect, applying a restricted network rule to the client includes using a per provider subscription management object (PPS-MO) for the first network to set an application policy that determines whether the application has permission to access the first network.

In another aspect, the application is a foreground application.

According to several other aspect, a system for managing network policy with a first network and a second network includes a transceiver configured to communicate wirelessly with the first network and the second network, a processor connected to the transceiver, and a memory for storing computer code for execution by the processor, the computer code configured to: discover the first network, determine if the first network is a restricted network, apply a restricted network rule to the client when the first network is a restricted network, set a first network score to the first network, set a second network score to the second network, lower the first network score of the first network when the first network is a restricted network so that the second network becomes a default network, and connect to the first network.

According to several other aspects, a non-transitory machine-readable storage medium storing instructions that upon execution: discovers a first network, connects with a second network, determines if the first network is a restricted network, applies a restricted network rule to the client when the first network is a restricted network, sets a first network score to the first network, sets a second network score to the second network, lowers the first network score of the first network when the first network is a restricted network so that the second network becomes a default network and an application that does not have permission to access the first network can access the second network, and connects to the first network.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
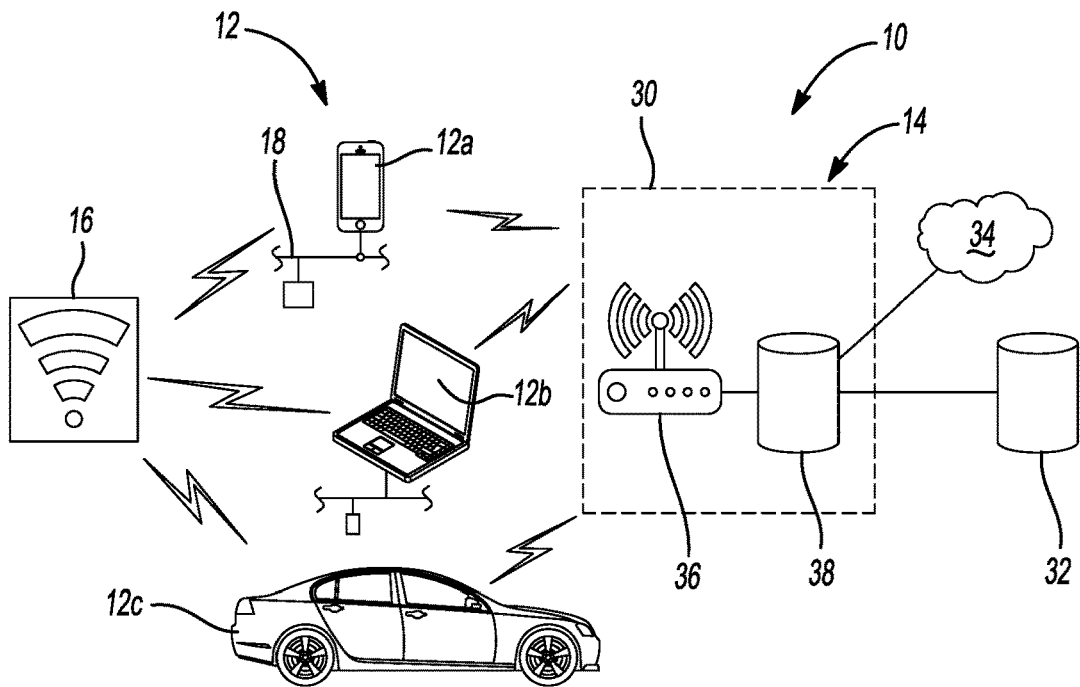
FIG. 1 is a schematic view of an exemplary multi-network architecture.

Referring to FIG. 1, an example of a multi-network architecture for use with the present invention is generally indicated by reference number 10. The multi-network architecture 10 generally includes two or more networks accessible by a client 12. In the example provided, the multi-network architecture 10 includes a Wi-Fi network 14, a telecommunications network 16, and an ethernet network 18. It should be appreciated that other networks may be used in the multi-network architecture 10 without departing from the scope of the present disclosure.

Figure 2:
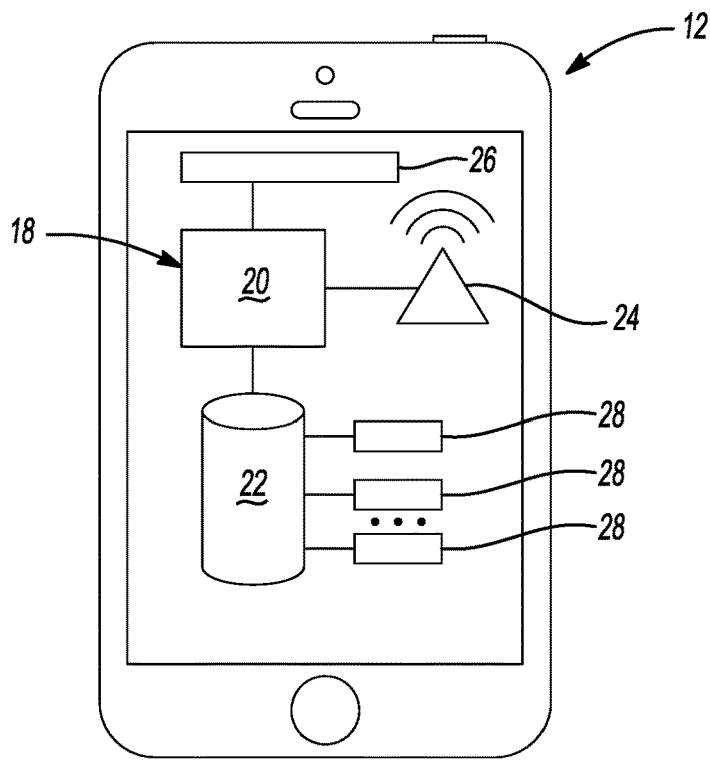
FIG. 2 is a schematic view of an exemplary client.

The client 12 is any mobile device capable of connecting to the multi-network architecture 10. For example, the client 12 may be a phone or smartphone 12A, a tablet or computer 12B, or a motor vehicle 12C, to name but a few. Referring briefly to FIG. 2, the client 12 generally includes a controller 18 which is a non-generalized, electronic control device having a preprogrammed digital computer or processor 20, memory or non-transitory computer readable medium 22 used to store data such as control logic, software applications, instructions, computer code, data, lookup tables, etc., a transceiver 24, and any number of input/output ports 26. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code. The processor 20 is configured to execute the code or instructions. The processor 20 is in communication with the non-transitory computer readable medium 22, the transceiver 24, and the input/output ports 26. The transceiver 24 is configured to wirelessly communicate with the Wi-Fi network 14 using Wi-Fi protocols under IEEE 802.11x and/or with the telecommunications network 16 using cellular data communication protocols such as LTE, etc. The input/output port is configured to communicate with the ethernet network 18. Where the client 12 is a motor vehicle 12C, the controller 18 may be a dedicated Wi-Fi controller or an engine control module, a transmission control module, a body control module, an infotainment control module, etc.

The client 12 further includes one or more applications 28. An application 28 is a software program configured to perform a specific function or set of functions. The application 28 may include one or more computer programs, software components, sets of instructions, procedures, functions, objects, classes, instances, related data, or a portion thereof adapted for implementation in a suitable computer readable program code. The applications 28 may be stored within the memory 22 or in additional or separate memory. Examples of the applications 28 include audio or video streaming services, games, browsers, social media, etc. In the example provided, the applications 28 include both background applications and foreground applications. A foreground application has an activity or service running on the client 12 in the foreground such that a user is aware of the application.

Returning to FIG. 1, the wireless network 14 is preferably configured under the IEEE 802.11u technical specifications and uses Access Network Query Protocol (ANQP). The wireless network 14 may have other configurations, including a network operative under the Wireless Broadband Alliance Next Generation Hotspot initiative as a Wi-Fi Certified Passpoint™ (Release 2 or later) Wi-Fi network, hereinafter referred to as "Hotspot 2.0". A description of Hotspot 2.0 is provided in Wi-Fi Alliance Hotspot 2.0 (release 2) Technical Specification Version 1.2, 2016, herein incorporated by reference. The Wi-Fi network 14 may be unrestricted or restricted. Where the Wi-Fi network 14 is restricted, the Wi-Fi network 14 restricts access by certain applications 28 to the Wi-Fi network 14. Which applications 28 are restricted and which are allowed is determined by a subscription service provided management object (SSP MO), as will be described below. Generally, the Wi-Fi network 14 includes a hotspot 30 that communicates with the client 12, a roaming partner or service provider 32, and an internet protocol network 34, such as the Internet.

The hotspot 30 is a site that offers access to packet data services, such as the Internet 34, using a Wi-Fi access network. The hotspot 30 may be public or private. The hotspot 30 includes an access point 36 and a local server 38. The access point 36 is a device or set of devices, such as a router, that instantiates any required IEEE 802.11 logical functions including security and authentication, as defined in IEEE 802.11-2012. The access point 36 may include additional control, user and management functions. The local server 38 is a local authentication, authorization and accounting (AAA) server and local online sign up (OSU) server.

The service provider 32 provides the network services of the hotspot 30. The service provider 32 includes remote AAA servers, remote OSU servers, subscriber management systems, and home location register (HLR) and high speed serial (HSS) interfaces, etc.

The telecommunications network 16 includes any wireless network provider for mobile devices. The telecommunications network 16 is configured to communicate using a high-speed wireless communication protocol, such as LTE, 4G, 5G, etc. The telecommunications network 16 provides voice to voice communications and access to the Internet 34. The Ethernet network 18 is a wired network connection linking two or more devices to form a local area network. The Ethernet network 18 communicates using an Ethernet protocol according to IEEE 802.3.

Figure 3:
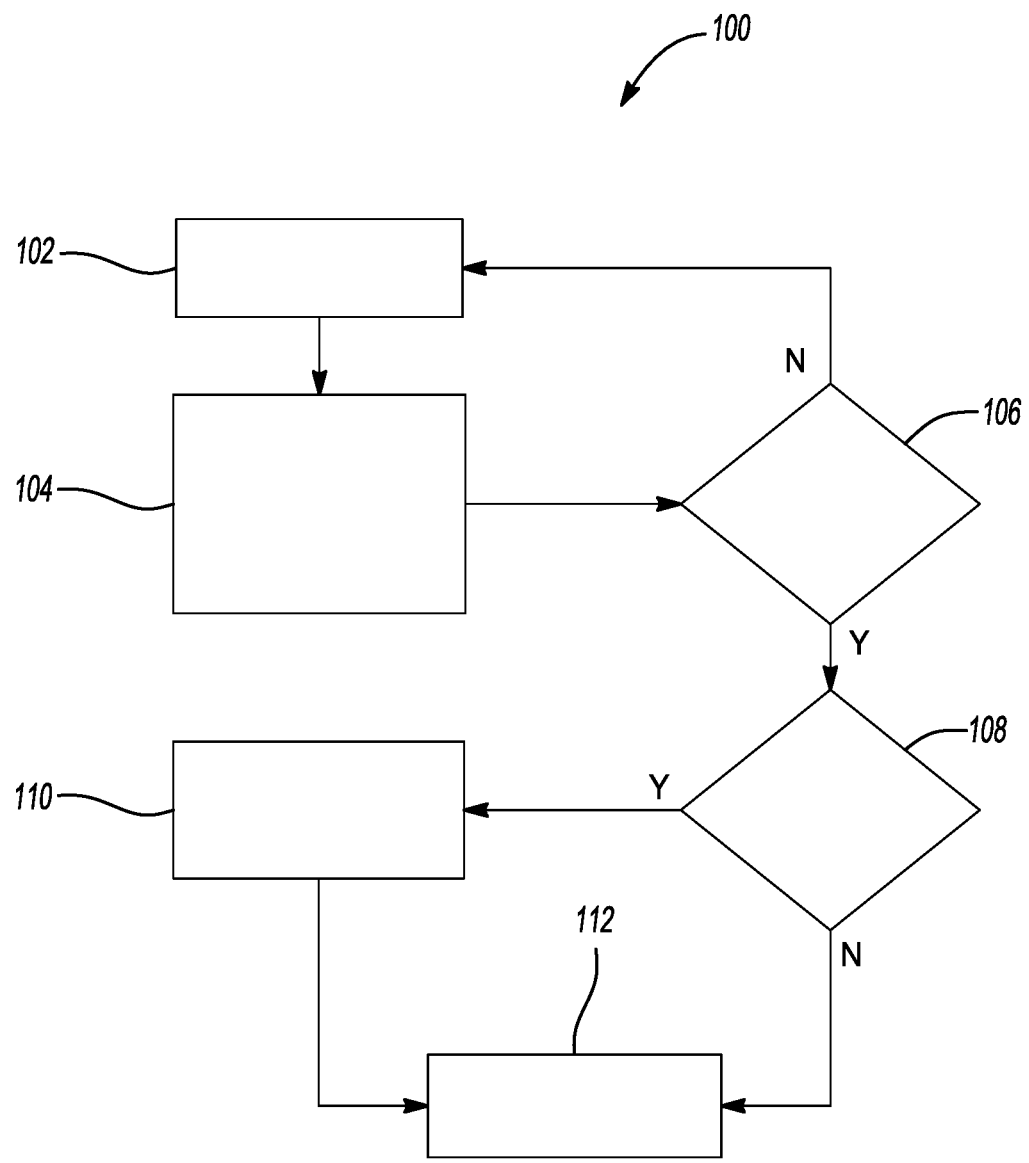
FIG. 3 is a flow chart illustrating an exemplary embodiment of a method for managing a network policy.

Turning now to FIG. 3, a method for managing a network policy between generically a first network and/or a second network is shown and generally indicated at reference number 100. The method 100 is configured to operate on the controller 18 of the client 12. The method 100 occurs within the multi-network architecture 10 and manages the network policy between the Wi-Fi network 14, i.e. a first network, and one or more of the telecommunications network 16, the ethernet network 18, or another network, i.e. a second network. In the example provided, the client 12 is connected to the second network during execution of the method 100. The method 100 starts at block 102 where the client 12 scans, or sends probe requests, for access points with which to connect. At block 104 the client 12 discovers the access point 36 with which to connect. The client 12 uses a pre-association discovery mechanism under IEEE 802.11u and ANQP and may use extensible authentication protocol (EAP) to discover the access point 36.

Once the access point 36 is discovered, the client 12 determines if the access point 36 has a saved Application Policy at block 106. The Application Policy is stored within a per provider subscription management object (PPS-MO). The PPS-MO establishes credential information and provides policy information to the client 12 for the selected hotspot 30 and service provider 32 of the access point 36. The PPS-MO may be already stored within the client 12 or provisioned by the service provider 32. Where the client 12 has not connected to the hotspot 30 previously, the client 12 communicates with the access point 26 and sets up a new account with the hotspot 30 and service provider 32. The client 12 is then provisioned by the service provider 16 with a PPS-MO.

The PPS-MO includes nodes, objects, or fields that contain data. An example of a PPS-MO for use with the method 100 is described in commonly assigned U.S. application Ser. No. 16/013,279 filed Jun. 20, 2018, hereby incorporated by reference in its entirety. The PPS-MO includes the Application Policy. The Application Policy sets an access permission of one or more of the applications 28 stored within the client 12 relative to the service provider 32.

The Application Policy includes an access type and an application policy list. The access type contains information related to what kind of access permission the application policy sets. An example of access permission include a type wherein the applications 28 have unrestricted access to the service provider 32. In this example, the Wi-Fi network 14 is characterized as unrestricted. In another example, the access type includes a whitelist type, a blacklist type, or a vendor type, all of which characterize a restricted Wi-Fi network 14. In the whitelist type the applications 28 have unrestricted access to the service provider 32 if the applications 28 are on the application policy list and are blocked from access to the service provider 32 if the applications 28 are not on the application policy list. In the blacklist type, the applications 28 have unrestricted access to the service provider 32 if the applications 28 are not on the application policy list and are blocked from access to the service provider 32 if the applications 28 are on the application policy list. In the vendor type, only applications 28 associated with a particular vendor are allowed access to the service provider 32. The application policy list includes a list of applications 28 for which access permission is to be defined. In one example, the applications 28 are listed according to a unique application identifier (ID). Application ID's may be those associated with the Android operating system and/or the Apple operating system.

If, at block 106, the access point 36 does not include a saved Application Policy or cannot be provisioned with a PPS-MO, the method 100 returns to block 102 and continues to scan for an access point. If the access point 36 includes a saved Application Policy, the method 100 proceeds to block 108 where the client 12 determines whether the Wi-Fi network 14 is a restricted network. As noted above, the Wi-Fi network 14 is considered a restricted network if the Application Policy within the PPS-MO restricts the access permission of one or more applications 28 to the Wi-Fi network 14.

If the Wi-Fi network 14 is restricted, the method proceeds to block 110. If the Wi-Fi network 14 is unrestricted, the method proceeds to block 112. At block 110 the client 12 applies a restricted Wi-Fi network (RWN) rule to the applications 28 of the client 12 and sets a network score. The RWN rule includes applying the rules of the PPS-MO to the applications 28, including the Application Policy.

The network score is a dynamic, numerical score that is applied to all networks to which the client 12 is connected. Thus, the client 12 sets a network score for the telecommunications network 16 and the Ethernet network 18, or any other connected network. The network with the highest network score is set as a default network. The default network is the network for which an application 28 will use to send packets if no other networks are requested by the application 28. Certain applications 28 may use the default network or may request specific access to a particular network, including the restricted Wi-Fi network 16. At block 110 the client 12 lowers the numerical value of the network score of the restricted Wi-Fi network 16. The network score of the restricted Wi-Fi network 16 is preferably lowered to less than that of any connected unrestricted networks. Thus, if an application 28, including a foreground application, is restricted by the PPS-MO from accessing the restricted Wi-Fi network 16, the application 28 will use the default network, which is purposefully set as not the restricted Wi-Fi network 16, to send packets and access the Internet 34. Applications 28 not allowed to use the restricted Wi-Fi network 16 will therefore work over one of the telecommunications network 16 or Ethernet network 18 with no interruptions of service. Applications 28 that have permission to use the restricted Wi-Fi network 16 will have access to the restricted Wi-Fi network 16. At block 112 the client 12 associates with the access point 36 and operates under the RWN rules and lowered network score. When the client 12 is successfully associated and authenticated with the hotspot 30 the applications 28 can access the services for which the client 12 has subscribed.

The method 100 allows for seamless controlling of foreground applications from using a restricted Wi-Fi network without the application having to be aware of the restricted Wi-Fi network. Foreground applications that do not have access to the restricted Wi-Fi network will be allowed to use any other unrestricted networks connected to the client 12 instead of being blocked from accessing the Internet 34. Thus, the method 100 improves the functioning of the client 12 and improves the functioning of network management and application use.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for managing a network policy of an application on a client, the method comprising:
discovering, by the client, a first network;
determining if the first network is a restricted network;
applying a restricted network rule to the client when the first network is a restricted network;
lowering a network score of the first network when the first network is a restricted network;
associating with the first network; and
seamlessly controlling the application from using the restricted network without requiring the application to be aware of the restricted network and simultaneously connecting additional applications to an unrestricted network when the additional applications are prevented from accessing the restricted network.

2. The method of claim 1 wherein lowering the network score of the first network includes reducing a numerical value of the network score.

3. The method of claim 1 further comprising connecting to a second network.

4. The method of claim 3 further comprising setting a second network score to the second network, and wherein lowering the network score of the first network includes lowering the network score lower than the second network score.

5. The method of claim 4 wherein a network with the highest network score is set as a default network.

6. The method of claim 1 wherein determining if the first network is a restricted network includes determining if the client has a per provider subscription management object (PPS-MO) for the first network.

7. The method of claim 6 wherein determining if the first network is a restricted network includes determining if the PPS-MO includes an Application Policy.

8. The method of claim 7 wherein the Application Policy sets an access permission to the first network of the application on the client.

9. The method of claim 6 wherein the PPS-MO further includes nodes for credentials and associated data that have been provisioned by a service provider of the first network.

10. The method of claim 6 wherein the PPS-MO is associated with a set of protocols which allow the client to connect with the first network by saving client credentials and resubmitting the client credentials each time the client connects to the first network.

11. The method of claim 6 wherein the Application Policy includes an access type which indicates what kind of access permission the application policy sets.

12. The method of claim 11 wherein the access type includes a type wherein the application has unrestricted access to the first network.

13. The method of claim 11 wherein the access type includes a whitelist type wherein the application has unrestricted access to the first network if the application is on an application policy list and is blocked from access to the first network if the application is not on the application policy list.

14. The method of claim 11 wherein the access type includes a blacklist type wherein the application has unrestricted access to the first network if the application is not on an application policy list and is blocked from access to the first network if the application is on the application policy list.

15. The method of claim 11 wherein the access type includes a vendor type wherein only an application associated with a particular vendor is allowed access to the first network.

16. The method of claim 1 wherein discovering, by the client, the first network includes using pre-association discovery under IEEE 802.11u and Access Network Query Protocol (ANQP).

17. The method of claim 1 wherein applying a restricted network rule to the client includes using a per provider subscription management object (PPS-MO) for the first network to set an application policy that determines whether the application has permission to access the first network.

18. The method of claim 1 wherein the application is a foreground application.

19. A system for managing network policy with a first network and a second network, the system comprising:
a transceiver configured to communicate wirelessly with the first network and the second network;
a processor connected to the transceiver; and
a memory for storing computer code for execution by the processor, the computer code configured to:
discover the first network;
determine if the first network is a restricted network;
apply a restricted network rule to a client when the first network is a restricted network;
set a first network score to the first network;
set a second network score to the second network;
lower the first network score of the first network when the first network is a restricted network so that the second network becomes a default network;
associate with the first network; and
seamlessly control an application from using the restricted network without requiring the application to be aware of the restricted network and simultaneously connect additional applications to an unrestricted network when the additional applications are prevented from accessing the restricted network.

20. A non-transitory machine-readable storage medium storing instructions that upon execution:
discovers a first network;
connects with a second network;
determines if the first network is a restricted network;
applies a restricted network rule to a client when the first network is a restricted network;
sets a first network score to the first network;
sets a second network score to the second network;
lowers the first network score of the first network when the first network is a restricted network so that the second network becomes a default network and an application that does not have permission to access the first network can access the second network;
associates to the first network; and
seamlessly controls the application from using the restricted network without requiring the application to be aware of the restricted network and simultaneously connects additional applications to an unrestricted network when the additional applications are prevented from accessing the restricted network.

* * * * *